(12) United States Patent
Dharmaji

(10) Patent No.: US 10,291,669 B2
(45) Date of Patent: May 14, 2019

(54) PLATFORM FOR FACILITATING PACED, SYNCHRONOUS INTERACTIVE EXPERIENCES

(71) Applicant: Vyu Labs, Inc., Cupertino, CA (US)

(72) Inventor: Srinivasa Dharmaji, Cupertino, CA (US)

(73) Assignee: Vyu Labs, Inc., Cupertino, CA (US)

( * ) Notice: Subject to any disclaimer, the term of this patent is extended or adjusted under 35 U.S.C. 154(b) by 199 days.

(21) Appl. No.: 15/167,433

(22) Filed: May 27, 2016

(65) Prior Publication Data

US 2016/0366197 A1    Dec. 15, 2016

Related U.S. Application Data

(60) Provisional application No. 62/175,052, filed on Jun. 12, 2015.

(51) Int. Cl.
*G06F 13/00* (2006.01)
*H04L 29/06* (2006.01)
*G06Q 50/00* (2012.01)

(52) U.S. Cl.
CPC ......... *H04L 65/4076* (2013.01); *G06Q 50/01* (2013.01); *H04L 65/1083* (2013.01)

(58) Field of Classification Search
CPC ............... H04L 29/08072; H04L 29/06; H04L 29/0809; H04L 29/08117; H04L 65/4076; H04L 65/1083; G07F 17/32; G07F 17/3244; G07F 17/3267; G07F 17/3239; G07F 17/3248; G06Q 30/02; G06Q 50/01; G06F 13/00
USPC ............................................ 463/25; 709/219
See application file for complete search history.

(56) References Cited

U.S. PATENT DOCUMENTS

| | | | |
|---|---|---|---|
| 2014/0171179 A1* | 6/2014 | Ball | G07F 17/32 463/25 |
| 2015/0058324 A1* | 2/2015 | Kauwe | G06Q 50/01 707/722 |

* cited by examiner

*Primary Examiner* — Robert B Harrell
(74) *Attorney, Agent, or Firm* — Michael A. Glenn; Perkins Coie LLP

(57) ABSTRACT

Various embodiments concern a platform for creating and managing paced, synchronous interactions between a celebrity and one or more audience members. More specifically, the platform generates interfaces that are accessible on user devices (e.g., mobile phones, tablets, personal computers) and that display media content. For example, live media content could be captured by the celebrity's user device and then broadcast to user device(s) associated with the audience member(s) in real time. In some embodiments, audience member(s) may also be able to capture and broadcast live media content. For example, an audience member may wish to record a question for the celebrity or answer a question posed by the celebrity.

18 Claims, 17 Drawing Sheets

PLATFORM FOR FACILITATING PACED, SYNCHRONOUS INTERACTIVE EXPERIENCES

CROSS-REFERENCE TO RELATED APPLICATIONS

This application claims priority to and the benefit of U.S. Provisional Application 62/175,052, entitled "PACED, SYNCHRONOUS AUDIENCE INTERACTION PLATFORM" filed on Jun. 12, 2015.

RELATED FIELD

Various of the disclosed embodiments concern techniques and systems for enabling paced, real-time interactions between a celebrity and one or more audience members having limited participation capabilities.

BACKGROUND

Social interactions or exchanges between two or more individuals can, and often do, improve the relationships between those individuals. In fact, social relationships are often strongest between those individuals who interact with one another the most (e.g., family members and friends).

Social relationships may be central to the success of certain individuals. For example, popular individuals who have attained success in sports, entertainment, business, etc., (also referred to herein as "celebrities") may be paid more for advertising or endorsing a product if they have a significant social media following or a large number of fans in particular marketing segments. However, it is often difficult for celebrities to have meaningful interactions with their fans for a variety of reasons (e.g., lack of control or time).

SUMMARY

Systems and techniques for enabling and facilitating paced, synchronous interactions between a celebrity and one or more fans are described herein. The fan(s) may also be referred to as "audience members" of an interactive session that is hosted by the celebrity. Oftentimes, the audience member(s) have limited and qualified participation capabilities. For example, some audience members may only be able to watch a live video stream of the celebrity, while other audience members may be able to initiate a live video stream in which they ask the celebrity questions, answer questions posed by the celebrity, etc.

Both the celebrity and the audience member(s) can access an interactive session via an application executing on a user device. The application may be able to present a variety of interfaces for different situations. For example, the celebrity may be able to access a recording interface that includes useful icons for live streaming (e.g., initiate stream, terminate stream, visual or audible filters, etc.), while an audience member may only be able to access a presentation interface that simply allows the audience member to view/hear the streamed media.

The application could be supported by a platform that creates and schedules interactive sessions, maintains an archive of past sessions, generates data records for individual users (e.g., celebrities and audience members), etc. For example, the platform may create a unique user profile for each user of the platform who enters registration information through the application. In some embodiments, users are able to link a platform account with a social media/networking account. Such linking may be desirable or necessary in certain instances (e.g., where the platform requires a celebrity to authenticate himself or herself, or where the platform wishes to verify a prospective audience member is an actual person).

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
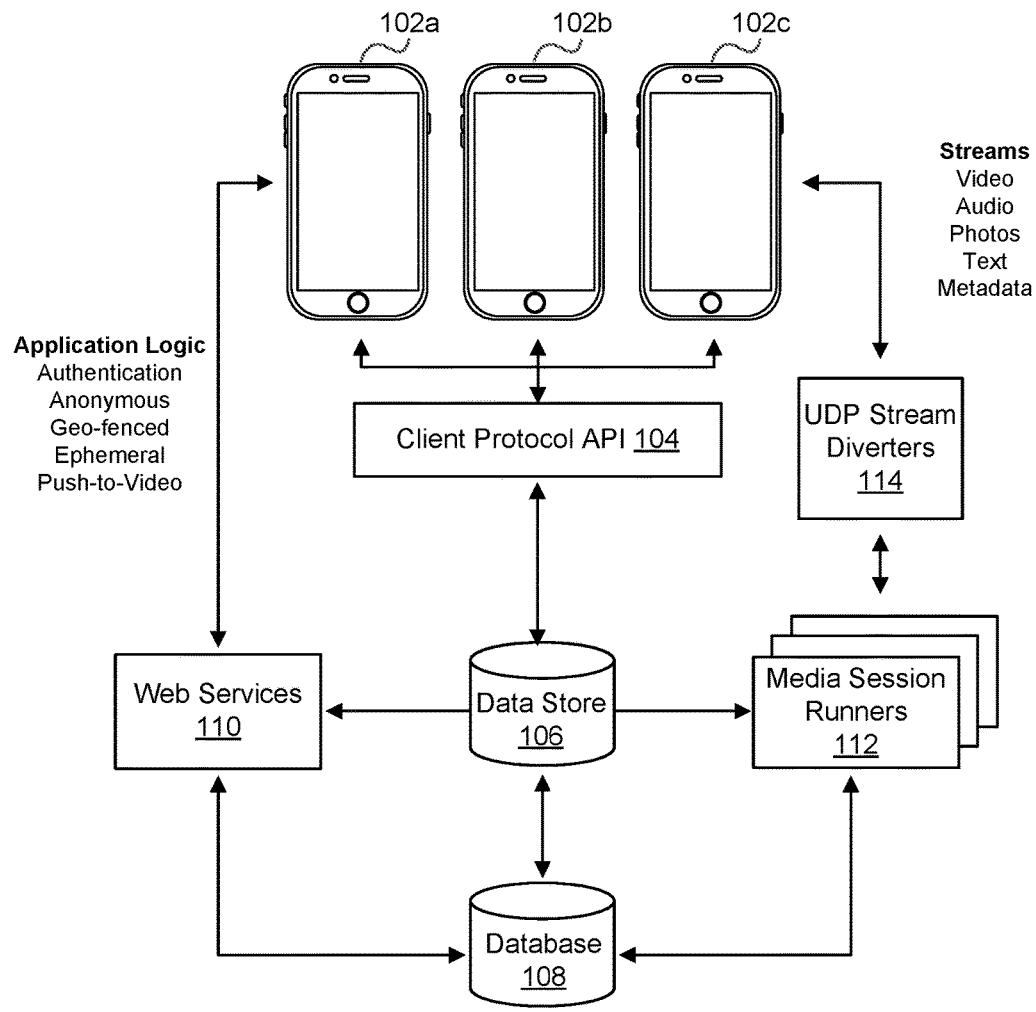
FIG. 1 is a generalized block diagram illustrating the architecture of a platform that facilitates interactions between a popular individual (also referred to as a "celebrity") and one or more other individuals who have an interest in the celebrity.

Systems and techniques for enabling and facilitating paced, synchronous interactions between a celebrity and one or more fans audience members are described herein. The fan(s) may also be referred to as "audience members" of an interactive session that is hosted by the celebrity. Oftentimes, the audience member(s) have limited and qualified participation capabilities. For example, some audience members may only be able to watch a live video stream of the celebrity, while other audience members may be able to initiate a live video stream in which they ask the celebrity questions, answer questions posed by the celebrity, etc.

More specifically, both the celebrity and the audience member(s) can participate in an interactive session using an application executing on a user device (e.g., a mobile phone, tablet, or personal computer). The application enables the celebrity to initiate a live media stream to the audience member(s). The media stream, which could include video, audio, photos, text, and/or metadata, is captured by a user device associated with the celebrity. In some embodiments, an audience member is permitted to initiate a second live media stream in which the audience member can pose a question, submit a response, etc. Thus, the application may permit full-duplex communications between the celebrity and some or all of the audience member(s).

Although the drawings depict mobile phones, the techniques and systems described herein can be used with any electronic device (also referred to herein as a "user device") that is capable of displaying and/or capturing media content, such as personal computers, tablets, personal digital assistants (PDAs), mobile phones, game consoles (e.g., Sony PlayStation or Microsoft Xbox), mobile gaming devices (e.g. Sony PSP or Nintendo 3DS), music players (e.g., Apple iPod Touch), wearable electronic devices (e.g., watches), network-connected ("smart") devices (e.g., televisions), and other portable electronic devices.

Moreover, one skilled in the art will recognize that a "live stream" of media content could include audio, video, or both. The use of either of these terms with respect to specific examples is intended to be illustrative only.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import shall refer to this specification as a whole and not to any particular portions of this specification. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted by using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for some of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is intended to be illustrative only and is not intended to further limit the scope and meaning of the disclosure or of any exemplified term. Likewise, the disclosure is not limited to the various embodiments given in this specification.

System Overview

FIG. 1 is a generalized block diagram illustrating the architecture of a platform 100 that facilitates interactions between a popular individual (also referred to as a "celebrity") and one or more other individuals who have an interest in the celebrity. When these other individual(s) participate in an interactive session with the celebrity, they could be referred to as "audience members." The interactive session represents a forum through which the celebrity can establish a paced, synchronous session with the audience member(s). For example, each audience member may interact with the celebrity via an application that is executed by a corresponding user device 102a-c. "Users" of the platform 100 include both celebrities and audience members; therefore, each of the user devices 102a-c could be associated with either a celebrity or an audience member.

Here, for example, three user devices 102a-c are executing the application, which implements a client protocol application programming interface (API) 104. The client protocol API 104 monitors user interactions with the application to control distribution, publication, subscription, etc., of streams (e.g., of video, audio, photos, text, and/or metadata). For example, the client protocol API 104 may process inputs received at a user interface presented on the display of the user devices 102a-c.

The client protocol API 104 serves as an interface between the user devices 102a-c and a data store 106 (e.g., an in-memory data store, such as Redis). The data store 106, which supports certain utilities (e.g., the publish and subscribe commands or "pub/sub"), could store content required for initiating the streams, information relevant to the users (e.g., registration information or usage statistics), etc. In some embodiments, the data store 106 is connected to a database 108 that is responsible for storing metadata, media content (e.g., video and audio), etc. For example, the database 108 may include an archive of previously-recorded interactive sessions that can be replayed at the user devices 102a-c through the application. Moreover, the database 108 may be an open-source cross-platform document-oriented database, such as MongoDB. In such embodiments, the database 108 could use dynamic schemas and/or JavaScript Object Notation (or JSON-like) documents.

Logic in the application executing on each user device 102a-c can control user authentication. For example, the application may be synced with one or more social media accounts (e.g., Facebook®, Twitter®, Snapchat®) of the user (e.g., celebrity or audience member) corresponding to the user device. The application may also maintain user anonymity, provide geo-fencing, and implement the ephemeral nature of the content and push-to-video mechanism. Control information and/or other user information can then be provided to a web service 110, which is a collection of protocols or stands that are used to exchange data between the application and the data store 106/database 108. More specifically, the web service 110 can effect redistribution and publication/subscription in connection with the content of the database 108 and/or data store 106. The web service 110 could be, for example, Node.js, a JavaScript-based framework.

The user(s) are able to control and/or access various streams presented on the user interfaces generated by the application. The stream(s) can include video, audio, photos, text, and/or metadata, which are provided via media session runners 112 through User Datagram Protocol (UDP) stream diverters 114. These techniques allow stream control and access to be maintained as further described below.

The term "application" is used herein for the purposes of illustration only, and one skilled in the art will recognize that the user interfaces described herein could be accessible via one or more of a web browser, mobile application, software program, or an over-the-top (OTT) application. The user interfaces may be accessed using any appropriate network-accessible electronic device, such as a mobile phone, tablet, personal computer, game console (e.g., Sony PlayStation® or Microsoft Xbox®), music player (e.g., Apple iPod Touch®), wearable electronic device (e.g., a watch or fitness band), network-connected ("smart") device (e.g., television), virtual/augmented reality system (e.g., Oculus Rift® or Microsoft Hololens®), or some other electronic device.

The following classes of individuals could use the application to establish an interactive session with fans or followers:

Top-class Celebrities (e.g., those with millions of followers): These celebrities are often very conscious about their brand image and may only provide answers to pre-approved questions. Said another way, these celebrities may not take live questions. Such sessions may proceed as follows:
   The celebrity user sets a limit on the maximum number of fan questions allowed (e.g., a default value of 100) while scheduling a session;
   One or more fans record question(s) (e.g., 15 second video recordings) for the celebrity and submit the question;
   A service stores the questions on a server, which is typically only associated with that session;
   The celebrity reviews the questions before the session and selects a few of them;
   The server streams the questions, for example one by one, in the order chosen by celebrity, when the celebrity taps on a question button that is presented on the display of the celebrity's user device; and
   When the celebrity completes answering the question, the celebrity taps on the question button again for the next question.

Politicians, YouTube Personalities, Journalists, etc.: These individuals may prefer to initiate a instance session with their followers that supports live interactions. In such embodiments, a push-to-control video floor scheme can be used as further described below.

Note that top-class celebrities could also choose to participate in live interaction sessions, and other celebrities (e.g., politicians, YouTube personalities, journalists) could elect to participate in a session that includes pre-recorded and vetted questions.

Figure 2:
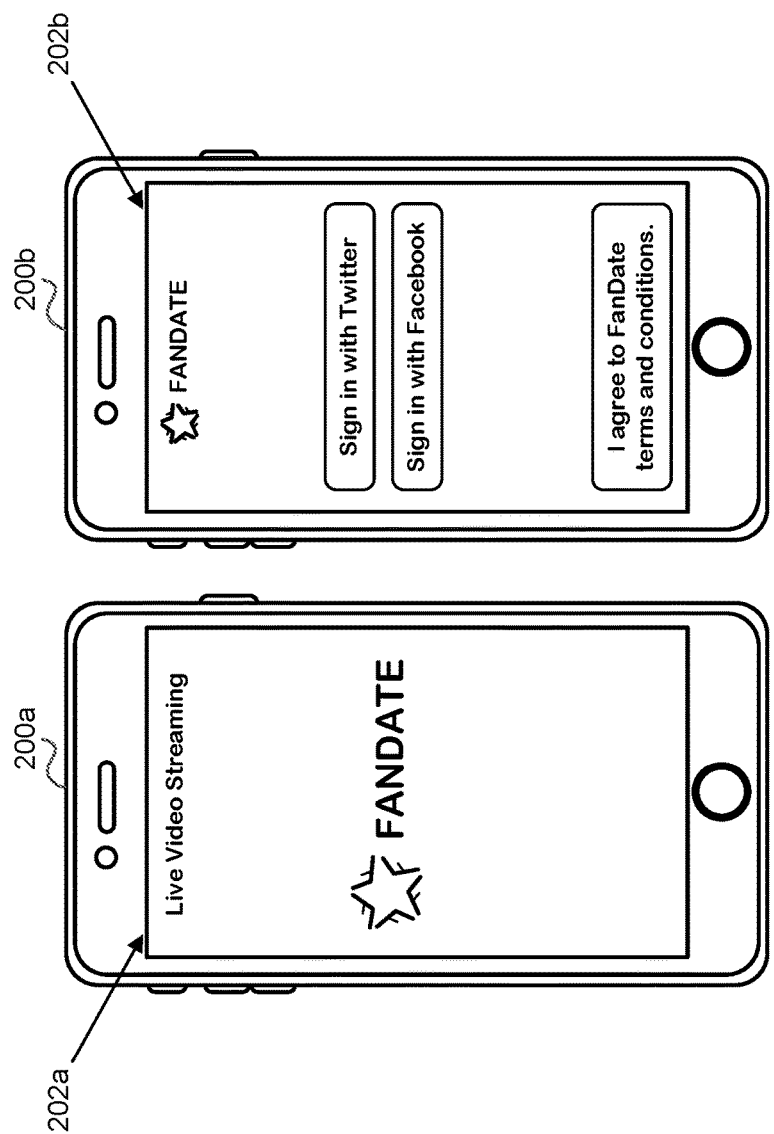
FIG. 2 includes screenshots of user interfaces that can be used to register with a service that facilitates paced, synchronous interactions between a celebrity and one or more audience members.

FIG. 2 includes screenshots of user interfaces 202a-b that can be used to register with a service that facilitates paced, synchronous interactions between a celebrity and one or more audience members. The user interfaces 202a-b may be accessible to user devices 200a-b through a web browser, mobile application, software program, or an OTT application.

In some embodiments, a user registers for the service (also referred to as "FanDate™") by signing into to a social media account (e.g., Facebook, Twitter, Snapchat). The term "user" can refer to any individual (e.g., a celebrity or a prospective audience member) who accesses the application. Such an action may link the user's account with the service to a particular social media account. Consequently, the user may not need to complete a tedious registration process in order to initiate the application and participate in interactive sessions. Instead, user information could be pulled from the social media account. For example, the underlying platform could extract the user's name, location, a count of the user's fans or followers, other social media presences associated with the user, etc.

In other embodiments, the service may require the user to manually complete a registration form or simply confirm that information extracted from a social media account is indeed correct. For example, the user may elect to associate an account with a particular social media account, and then the service may request additional information.

Figure 3:
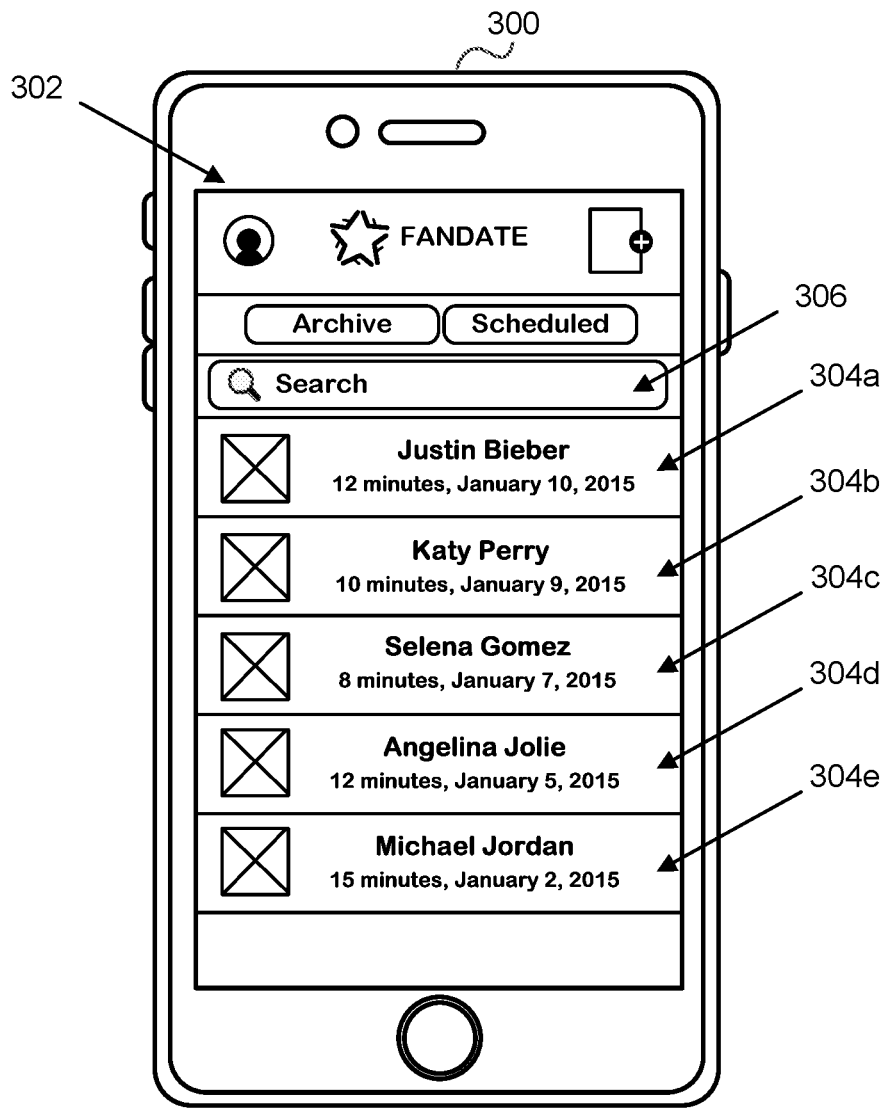
FIG. 3 depicts a user interface that includes a list of pending sessions to be facilitated by the platform.

FIG. 3 depicts a user interface 302 that includes a list of pending sessions 304a-e to be facilitated by the platform. Each of the sessions is a paced, synchronous interaction between a celebrity (here, Justin Bieber, Katy Perry, etc.) and one or more audience members. Each audience member interacts with the celebrity via a user interface that is presented on the display of a corresponding user device 300 (e.g., a mobile phone, tablet, or personal computer).

The list of sessions may be searchable by various criteria. For example, a prospective audience member may be able to search for the name of a particular celebrity or a keyword (e.g., "sports," "music") that is associated with individual sessions by entering these terms within a search bar 306. The audience member could also filter the sessions by recording date, session duration, etc. In some embodiments, audience members are able to browse archived sessions and/or scheduled sessions.

Figure 4:
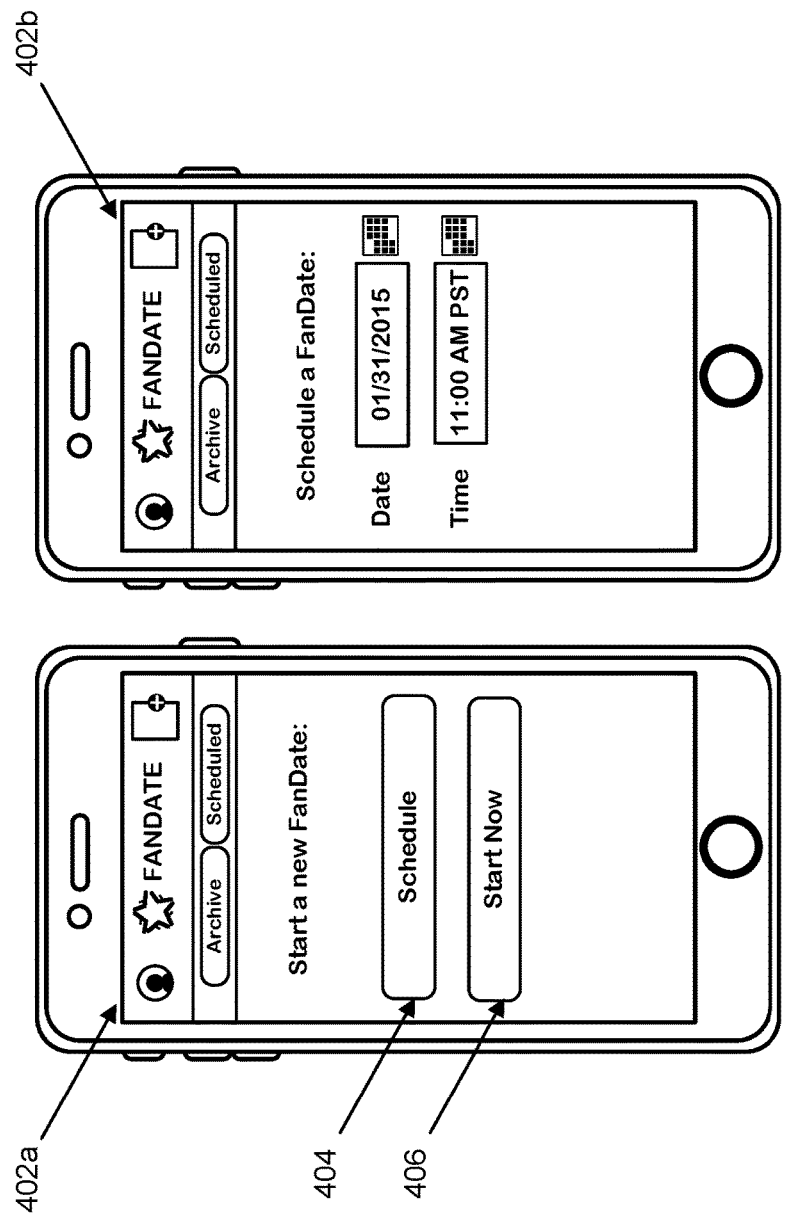
FIG. 4 includes screenshots of user interfaces that can be used by a user to create an interactive session.

FIG. 4 includes screenshots of user interfaces 402a-b that can be used by a user to create an interactive session. For example, a celebrity may be able to schedule a session for a later time by selecting a schedule button 404 and then specifying a date and/or time. A scheduled session can then be added to the celebrity's calendar and/or the calendar of some other individual (e.g., a manager).

In some embodiments, scheduled sessions are activated before the scheduled session start time. For example, sessions could be activated 10 or 15 minutes before the scheduled start time. Once a session has been activated, audience members may be permitted to interact with (e.g., tap or click) a link and access the session through the application.

The celebrity could also elect to commence an interactive session immediately by selecting a start now button 406. The celebrity may answer questions as they are submitted by one or more audience members, answer a predetermined set of questions, or simply record media content without any audience participation (e.g., a statement or performance). The celebrity may also be able to specify whether an interactive session is recorded and presented in real time or whether the interactive session is recorded and stored by the platform for subsequent viewing.

In some embodiments, a celebrity must meet certain requirements before the celebrity is allowed to create an interactive session. For example, the platform may require that the celebrity have 100,000 or 1,000,000 fans on social media (e.g., Twitter followers or Facebook fans).

Figure 5:
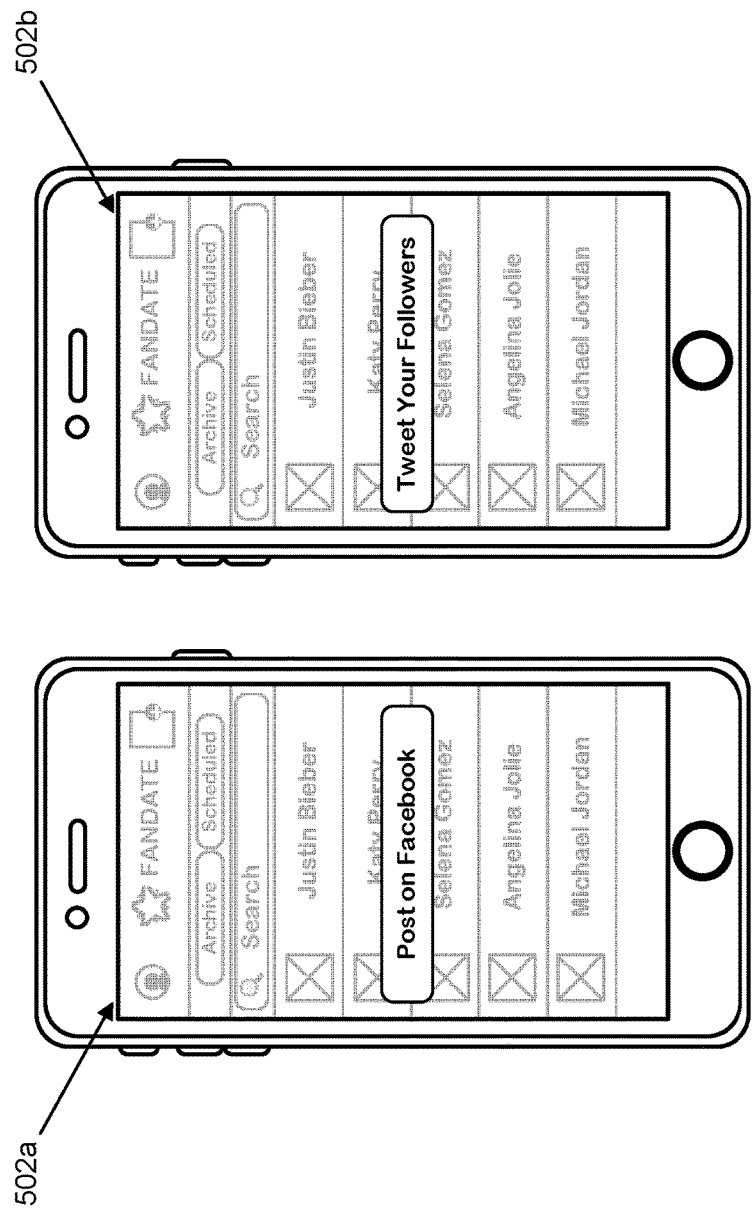
FIG. 5 includes screenshots of user interfaces that illustrate how a celebrity may be able to readily log into a social media account directly from the user interface.

The celebrity could provide proof that these requirements are met by linking his or her account with one or more social media accounts. FIG. 5, for example, includes screenshots of user interfaces 502a-b that illustrate how a celebrity may be able to readily log into a social media account directly from the user interface. When the celebrity has linked an account with one or more social media accounts, any interactive sessions that are scheduled by the celebrity could be announced across the corresponding social media channel(s). For example, an announcement of an upcoming interactive session may be announced to the celebrity's fan base by the celebrity's Facebook account, Twitter account, etc.

Figure 6:
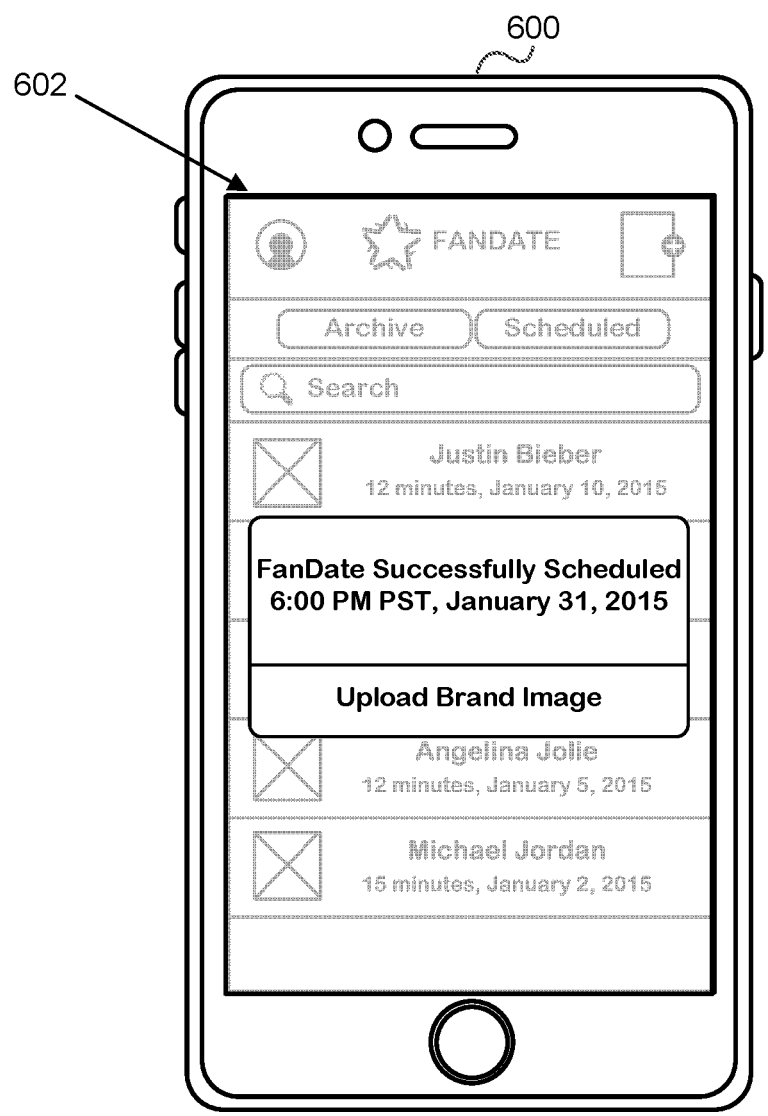
FIG. 6 depicts a user interface that includes a notification announcing an interactive session has been successfully scheduled.

FIG. 6 depicts a user interface 602 that includes a notification announcing an interactive session has been successfully scheduled. In some embodiments, the celebrity (or someone associated with the celebrity, such as a manager or family member) can upload a brand image, marketing information, etc., via the notification. The celebrity may also be able to announce the interactive session by pushing the notification out through one or more social media channels. For example, the celebrity may choose to announce the interactive session to the celebrity's Facebook fans, Twitter followers, etc.

In some embodiments, the notification automatically disappears after a predetermined interval of time has elapsed (e.g., five seconds) or if the user taps on the display of the user device 600 on which the notification is presented. In other embodiments, the application requires the celebrity confirm the interactive session by interacting with a particular element of the user interface (e.g., a confirmation button).

FIGS. 7A-E include screenshots of user interfaces that depict various stages of an interactive session between a celebrity and one or more audience members. A session initially begins with a start screen 702. During the broadcasting interval, the celebrity may be able to stop video and/or mute audio at any time. In some embodiments, the celebrity is also able to take questions from audience members (i.e., "open the floor" to an audience member) by tapping on a Q&A button 704.

Figure 7A:
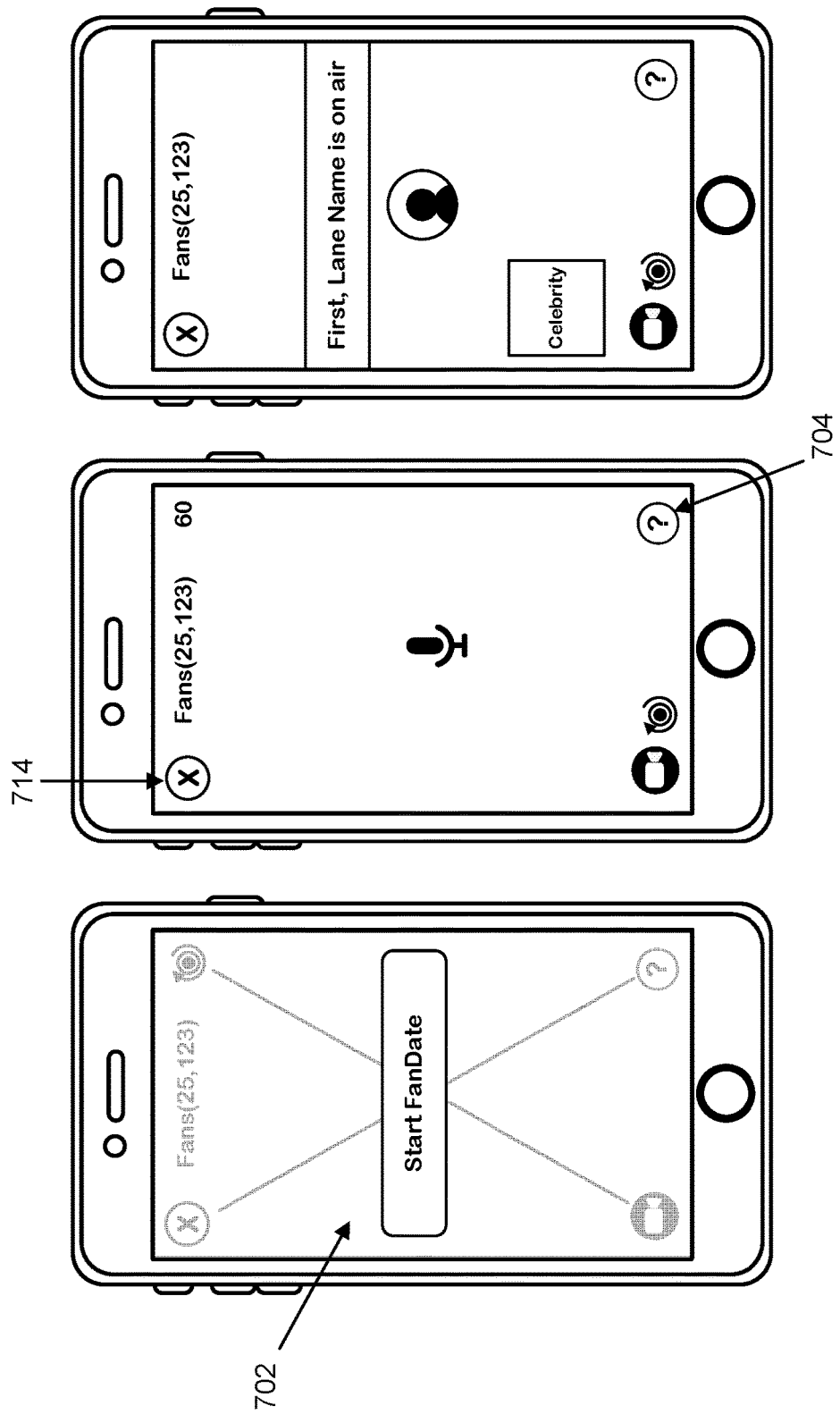
FIGS. 7A-E include screenshots of user interfaces that depict various stages of an interactive session between a celebrity and one or more audience members.
Figure 7B:
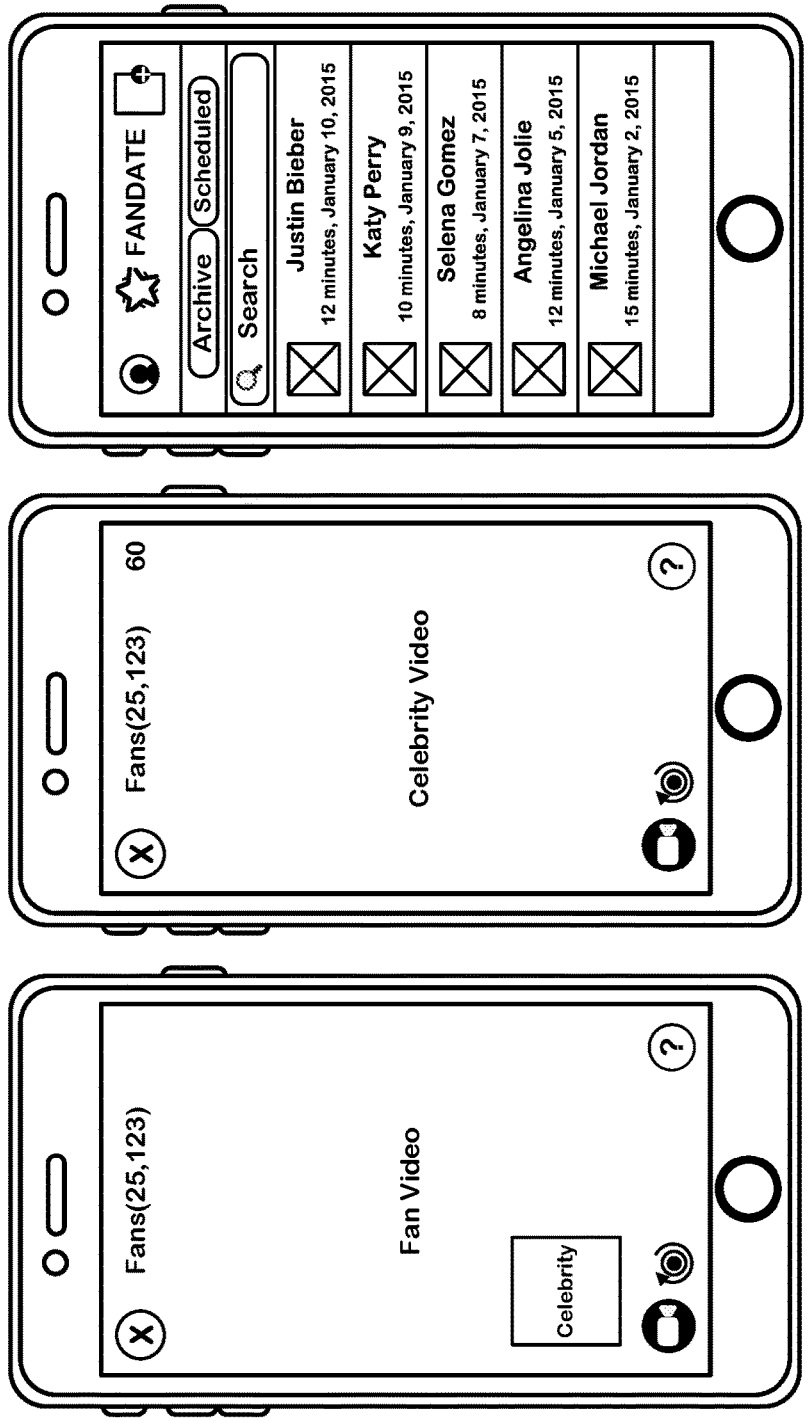
Figure 7C:
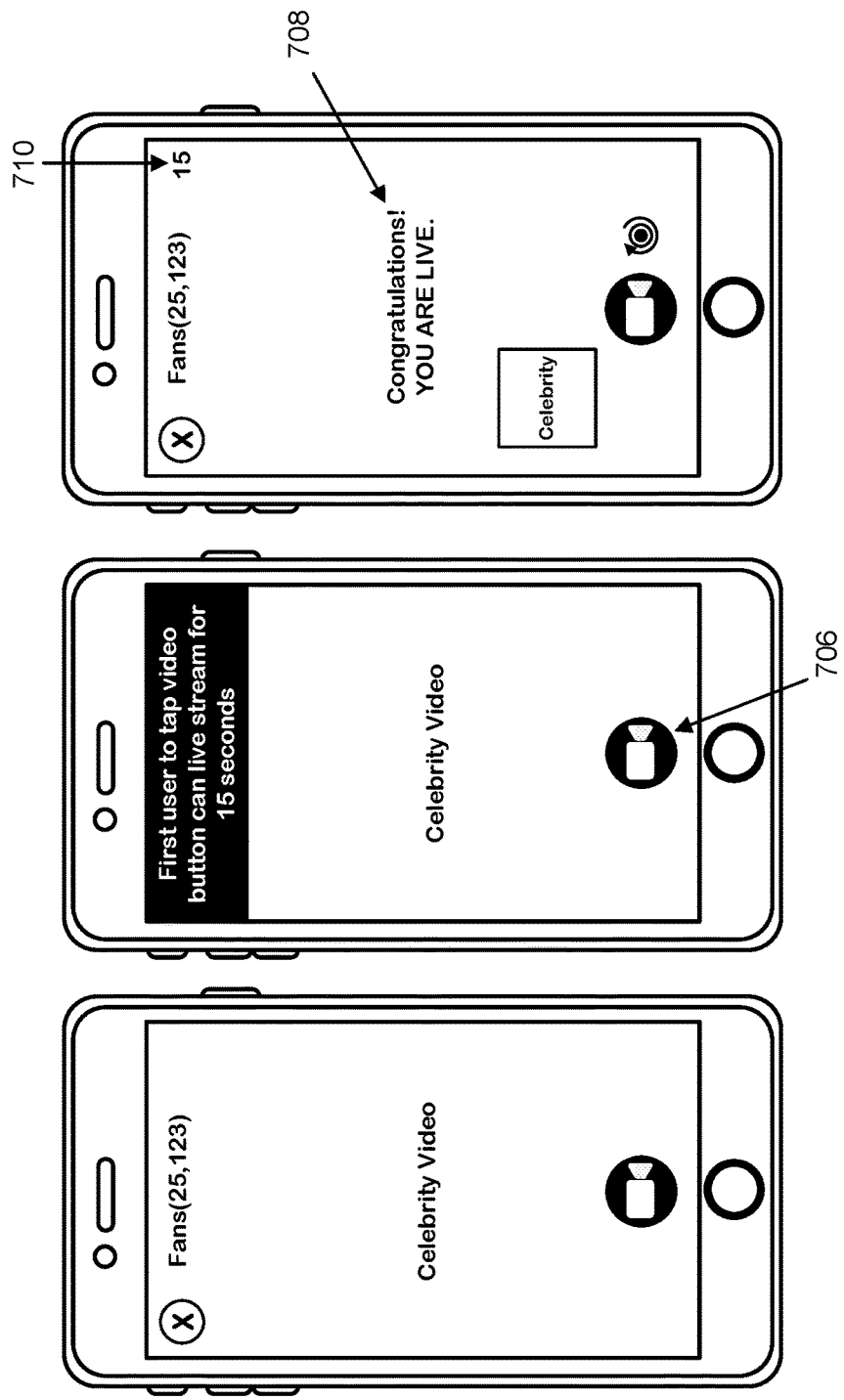

As shown in FIG. 7C, a video button 706 could be displayed to some or all of the audience member(s) that allows those audience member(s) to initiate a live media stream. For example, the video button 706 may be presented to a predetermined number of audience members (e.g., the first ten audience members to enter the session) or a subset of the audience member(s) who satisfy certain criteria (e.g., have an uplink speed of at least 500 Kbps or a certain number of social media fans).

Figure 7D:
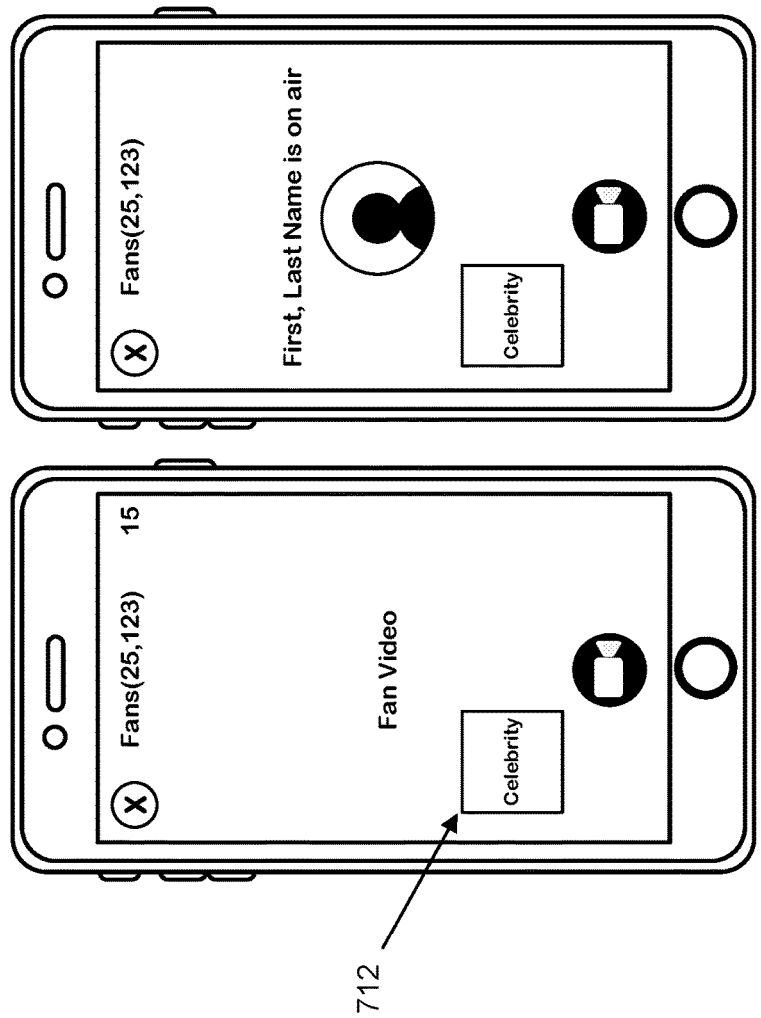
Figure 7E:
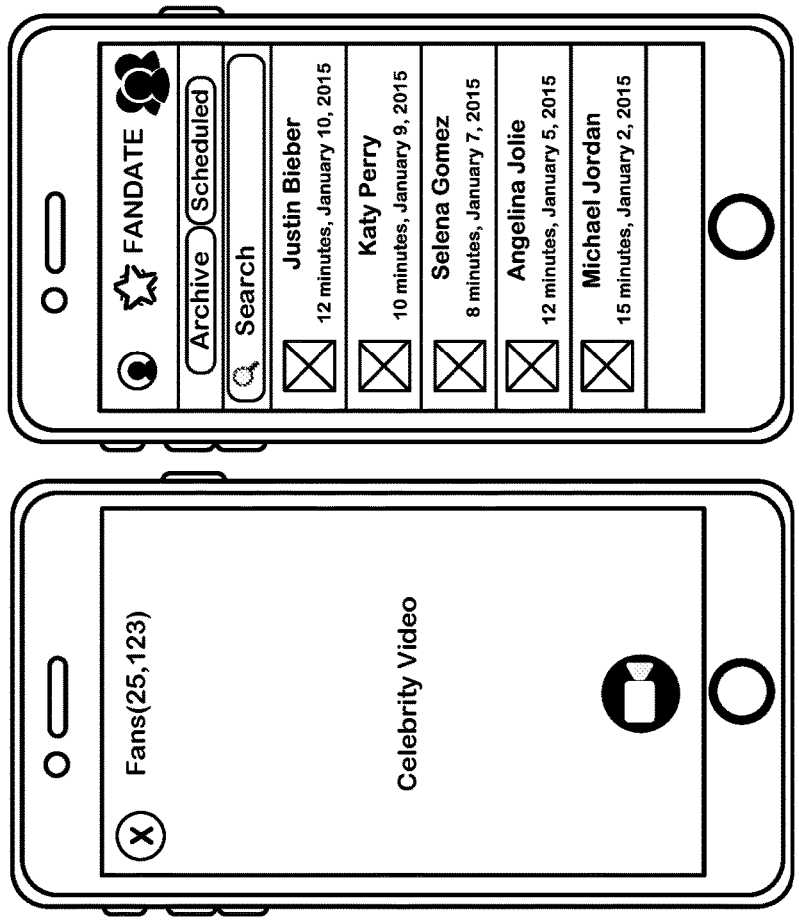

This may be necessary to provide a high quality user experience, as well as keep mischief mongers with fake social media accounts from asking inappropriate questions. The first audience member to tap on the video button 706 could be announced to all other audience members participating in the session by displaying the selected fan's profile picture and name for a few seconds (as shown by FIG. 7D) or by audibly announcing the selected audience member's name. In some embodiments, the celebrity and/or an administrator associated with the service who is responsible for managing the application are able to terminate the audience member's media stream at any time.

As shown in FIG. 7C, the audience member may be able to stream live media to the celebrity and the other audience member(s). After tapping the video button 706, a notification 708 could be presented that indicates the audience member's video/audio feed is now live. The session could also stream the media content and display a countdown 710 (e.g., downward from 15 seconds) that advises the audience member of the floor time remaining.

After the audience member's broadcast times out or is terminated (e.g., by the audience member, celebrity, or administrator), the floor button 712 is activated and the celebrity video is once again displayed. For example, the celebrity video may be automatically brought back to full screen on each participant's display when no audience members are uttering questions (i.e., when the celebrity "has the floor"). The celebrity can then continue the session by tapping on the Q&A button 704 or end the session by tapping on the close button 714.

As shown by in FIGS. 7C-D, an individual audience member's perspective generally consists mainly of the celebrity video feed unless another audience member is asking a question, submitting a comment, etc. In some embodiments, those audience members who are eligible to ask questions (and thus record themselves in real time) are visually notified on the display (e.g., by a blinking video button that appears on the display).

When an audience member is chosen (e.g., by being the first audience member to push the video button), the audience member will have the floor for a predetermined amount of time. The amount of time may be based on the expected length of the session, the length of the question submitted, or could simply be a specified amount (e.g., 10 or 15 seconds). After the amount of time expires, the video feed is ended and the user interface may automatically revert to a different layout. In some embodiments, the selected audience member, celebrity, and/or an administrator may be able to prematurely terminate the media feed.

A splash screen could also be displayed to an audience member that indicates the audience member is able to ask a question. Moreover, when an audience member has the floor, that audience member may be granted video and/or audio control. For example, the audience member may be able to stream a live video feed or record an utterance without streaming video. The celebrity's media stream will typically continue to be streamed (e.g., within another window shown by the user interface). Consequently, other audience members may simultaneously hear and/or see the audience member asking a question as well as the celebrity. Said another way, the media feeds during a an interactive session could be full duplex.

Figure 8:
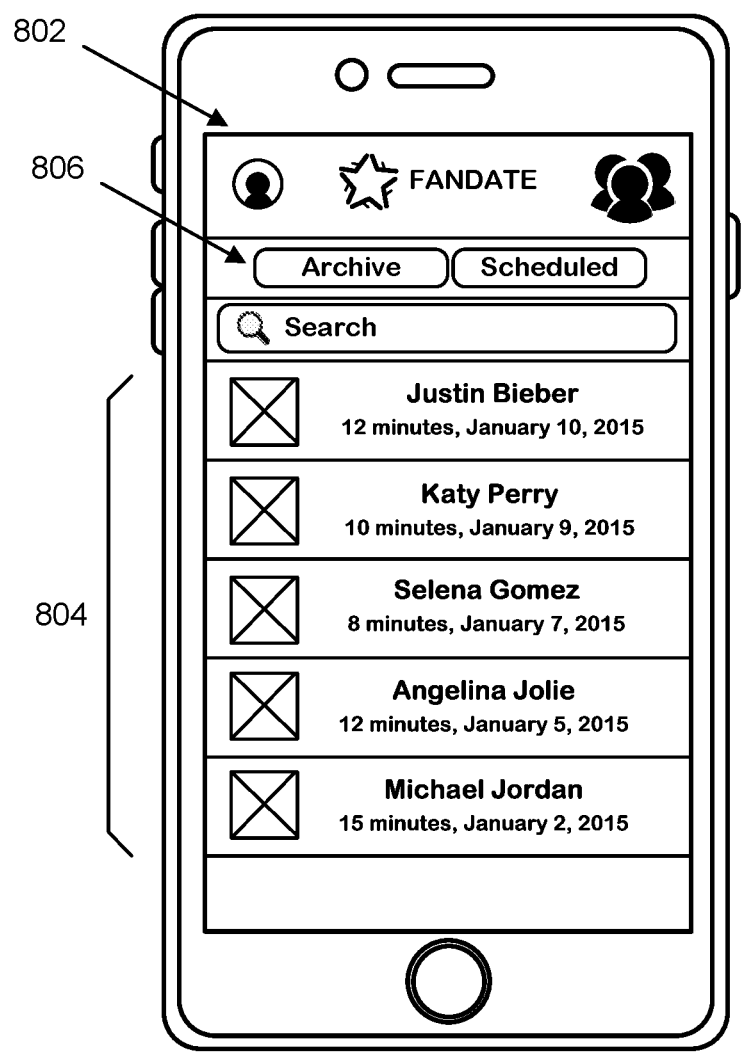
FIG. 8 depicts a screenshot of a user interface showing an archive of interactive sessions.

FIG. 8 depicts a screenshot of a user interface 802 showing an archive of interactive sessions 804. The interactive sessions 804 could include sessions in which questions were asked by audience members in real time, sessions in which pre-screened questions were read by the celebrity or another non-audience member, or both. Sessions in the archive may be replayed by through the application as desired.

The sessions could also be raw (i.e., unedited) recordings or processed (i.e., edited) recordings in which inappropriate questions, gaps of silence, etc., have been removed. Other media content (e.g., digital images and audio files, such as music or sound effects) could also be added to processed recordings that are stored in the archive. As shown in FIG. 8, the archive may be readily accessible by tapping on an archive button 806 that is presented on some or all of the user interfaces within the application.

Figure 9:
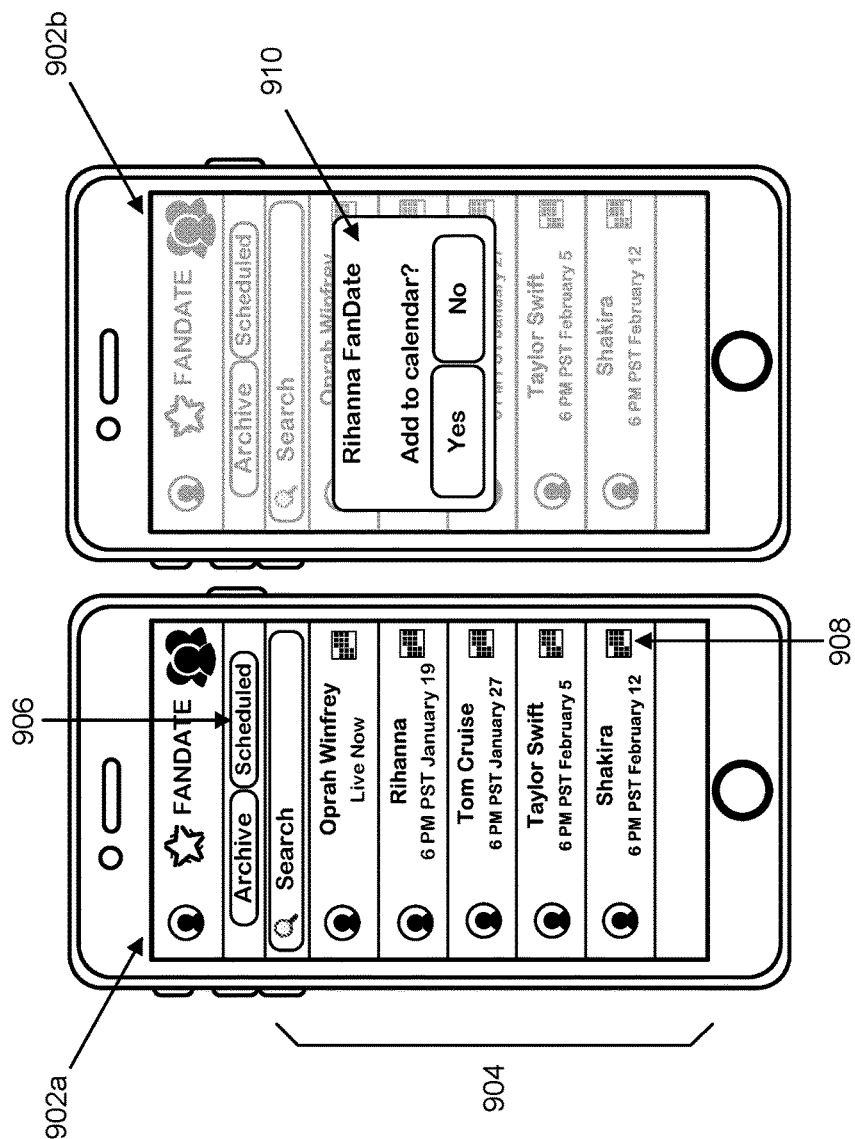
FIG. 9 depicts screenshots of user interfaces that can be used to easily add scheduled sessions to an audience member's calendar.

FIG. 9 depicts screenshots of user interfaces 902a-b that can be used to easily add scheduled sessions to an audience member's calendar. More specifically, a list of scheduled sessions 904 can be shown to the audience member upon selection of a scheduled button 906. The scheduled button 906 may be presented on some or all of the user interfaces accessible through the application.

A calendar icon 908 may be displayed for each session that allows audience members to easily add the scheduled sessions to a calendar program or application (e.g., Google Calendar, Microsoft Outlook, Apple iCloud Calendar). In some embodiments, a notification 910 may be presented upon selection of the calendar icon 908 that prompts the audience member to confirm whether the scheduled session should be added to a calendar. The notification 910 may also allow the audience member to select which calendar program or application should be used, send information about the scheduled session to another potential audience member (e.g., via text message, email, or social media), etc.

Figure 10:
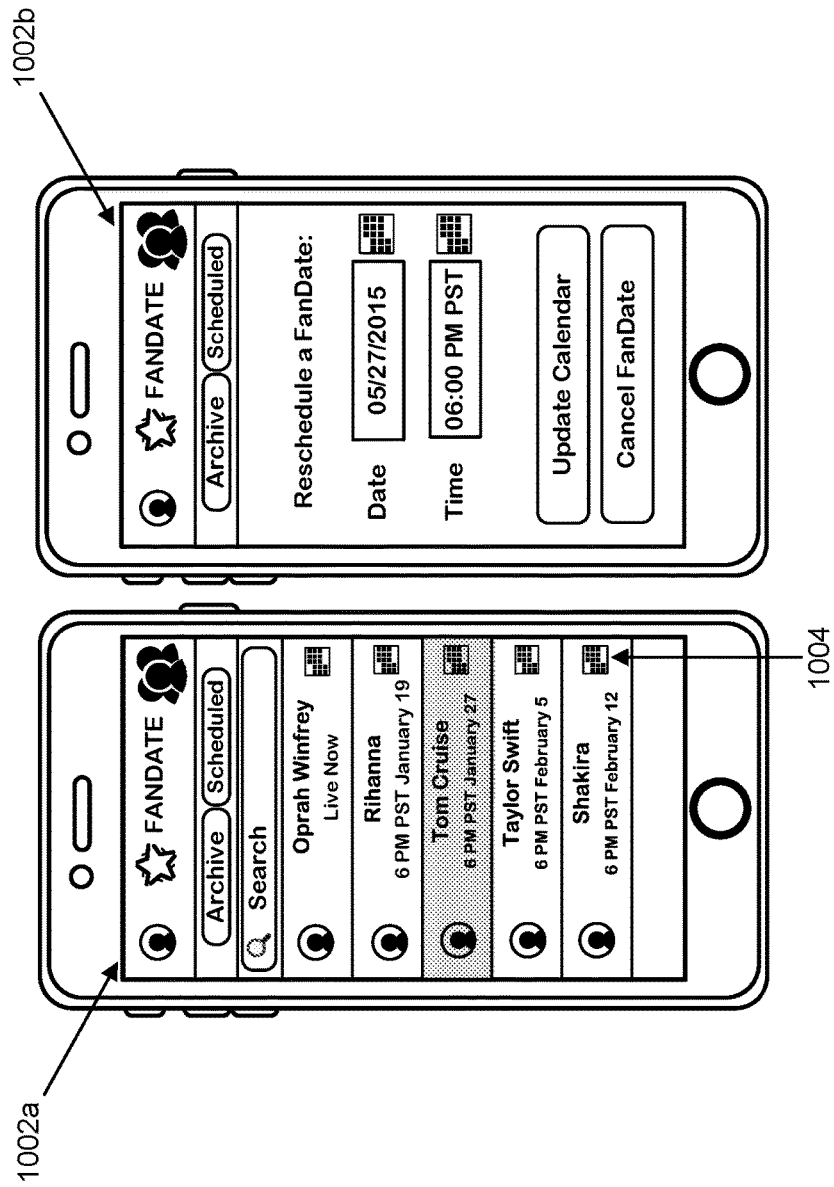
FIG. 10 includes screenshots of user interfaces showing how an interactive session can be easily rescheduled through the application.

FIG. 10 includes screenshots of user interfaces 1002a-b showing how an interactive session can be easily rescheduled through the application. More specifically, the application may allow the celebrity and/or an administrator to readily reschedule an interactive session by clicking a calendar icon 1004.

In some embodiments, potential audience members are also able to request that a session be moved by selecting a desired time. If a sufficient number of potential audience members request that the session be moved (e.g., a predetermined percentage of all social media fans or confirmed attendees), the celebrity and/or the administrator may have additional motivation to move the session to a different date/time.

In such scenarios, the celebrity can access the session schedule and set a new date and/or time for the session. A notice of the new date/time could be broadcast to all fans of the celebrity (e.g., through social media) or only those fans who have indicated an interest in attending the session (e.g., through the application). The notice can be transmitted via text message, email message, push notification, social media, etc. In some embodiments, the fans are able to specify (e.g., via a preferences menu accessible through the application) which communication channel should be used.

Figure 11:
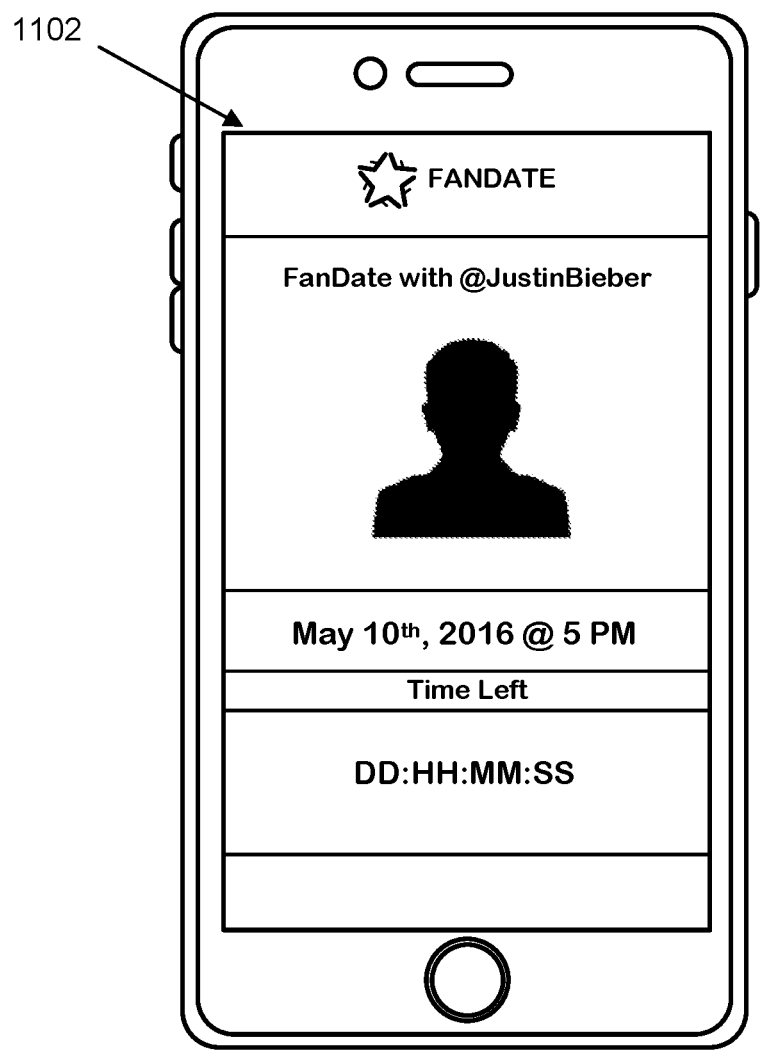
FIG. 11 depicts a screenshot of a start page for an interactive session.

FIG. 11 depicts a screenshot of a start page 1102 for an interactive session. The application may allow audience members to enter a session before the celebrity has initiated the live media feed. In such instances, a static interface could be displayed that includes a session label, the celebrity's name, the time/date the session is set to begin, a countdown depicting the time until the session is set to begin, etc.

Alternatively, a dynamic interface could be displayed that includes advertisements, previews for upcoming sessions, media clips from previous sessions, media clips about the corresponding celebrity, etc.

Figure 12:
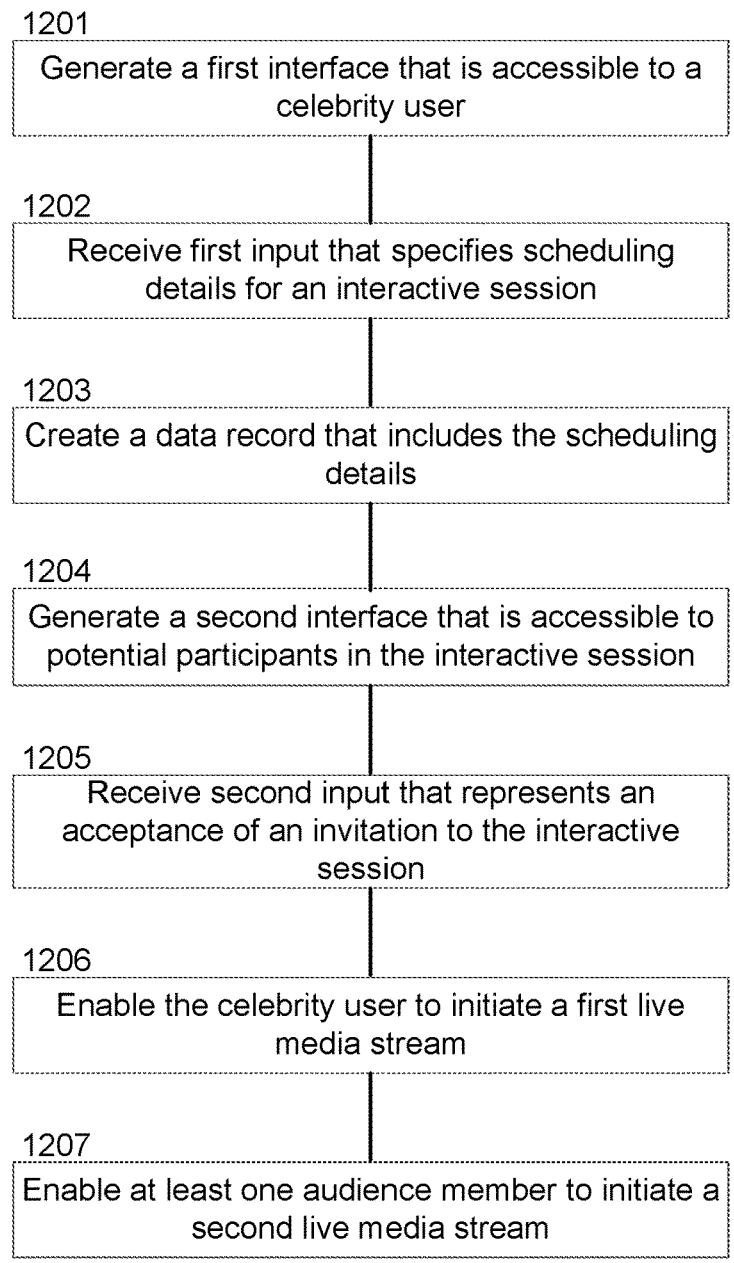
FIG. 12 depicts a process for facilitating a paced, synchronous session between a celebrity user and one or more other users of the platform described herein.

FIG. 12 depicts a process 1200 for facilitating a paced, synchronous session between a celebrity user and one or more other users of the platform described herein. The platform initially generates a first interface that is accessible to the celebrity user on a user device (e.g., a mobile phone, tablet, or personal computer) (step 1201). For example, the first interface may be accessible through a web browser, mobile application, software program, or an OTT application.

The platform can then receive first input from the user device that is indicative of user input that specifies scheduling details for the session (step 1202). The scheduling details could include an initial date and time for the interactive session. A data record can also be created for the interactive session that includes at least some of the scheduling details (step 1203). Thus, the platform may create a distinct record for each scheduled session. In some embodiments, media content and information associated with the scheduled session is stored in a distinct physical or digital storage medium (e.g., a unique cloud database).

The platform may also generate a second interface that is accessible to other users of the platform on user devices (step 1204). These other users represent potential participants or "audience members" in the interactive session. The platform can then receive second input from the user device(s) associated with the potential audience member(s) that represents an acceptance of an invitation to the interactive session (step 1205). An audience member could indicate a desire to attend the interactive session by adding the session to a calendar, clicking a confirmation link, etc.

The platform can then create the interactive session, which is accessible to the celebrity user through the first interface and the audience member(s) through the second interface. As noted above, these interfaces allow the celebrity user and the audience member(s) to engage in full-duplex interactions. More specifically, the application can enable the celebrity user to initiate a first live media stream that is broadcast to the user device(s) associated with the audience member(s) in real time (step 1206). In some embodiments, the application also enables at least one audience member to initiate a second live media stream that is broadcast to the user device associated with the celebrity user and the user device(s) associated with any other audience member(s) in real time (step 1207). The first and second live media streams could include audio, video, etc. Thus, the platform (and, more specifically, the application) permits the celebrity user and audience member(s) to have meaningful interactions by streaming live media across a network.

Unless contrary to physical possibility, it is envisioned that the steps described above may be performed in various sequences and combinations. For instance, the user device may simultaneously generate the first and second interfaces. Other steps could also be included in some embodiments. For example, the platform may calculate a score for each potential audience member in some embodiments that is indicative of whether the audience member is an actual human being, a mischief monger with a fake social media account, etc. The score could be based on a set of factors (e.g., whether the user has been authenticated, how many social media fans the user has, whether the user has previously posed questions, whether the user has participated in previous inactive sessions). Responsive to determining the score exceeds a threshold, the user may be permitted to join the interactive session and/or be marked as eligible to participate in the interactive session (i.e., initiate a live media stream).

Processing System

Figure 13:
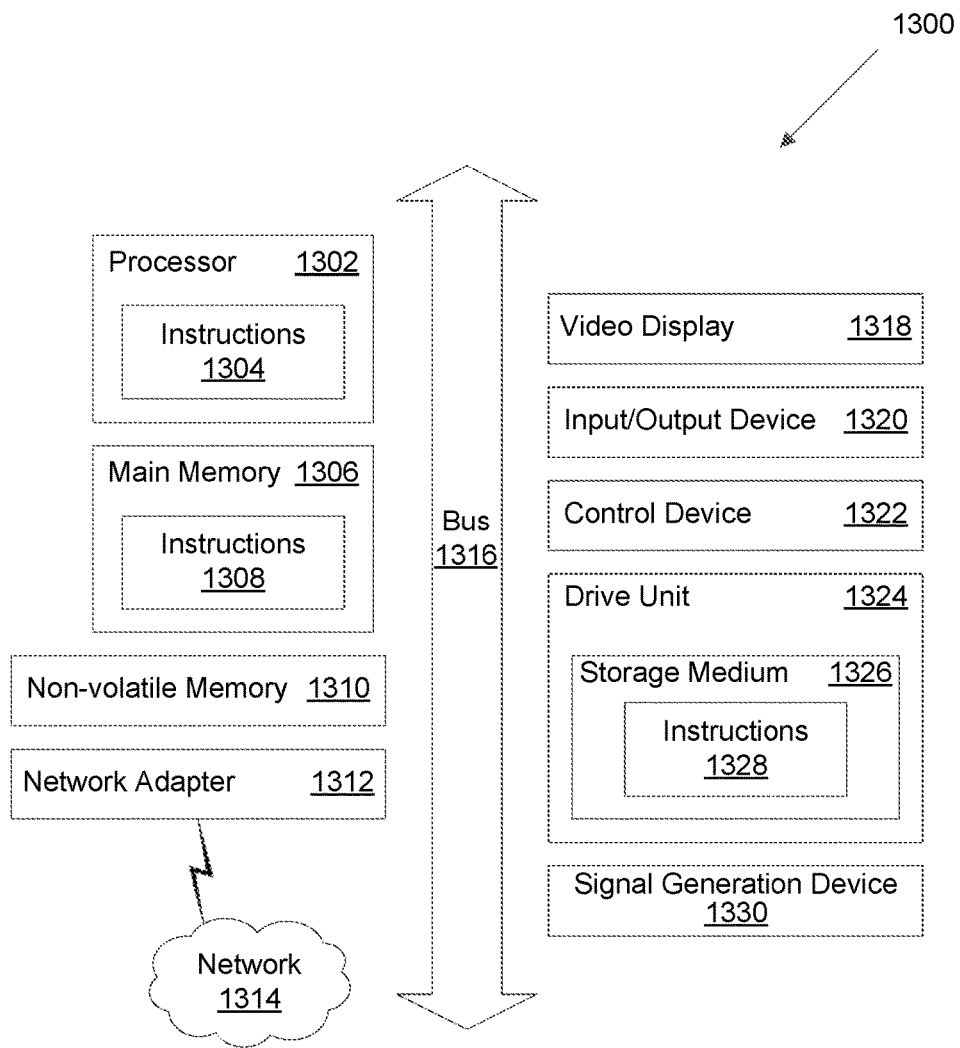
FIG. 13 is a block diagram illustrating an example of a processing system in which at least some operations described herein can be implemented.

FIG. 13 is a block diagram illustrating an example of a processing system 1300 in which at least some operations described herein can be implemented. The computing system may include one or more central processing units ("processors") 1302, main memory 1306, non-volatile memory 1310, network adapter 1312 (e.g., network interfaces), video display 1318, input/output devices 1320, control device 1322 (e.g., keyboard and pointing devices), drive unit 1324 including a storage medium 1326, and signal generation device 1330 that are communicatively connected to a bus 1316. The bus 1316 is illustrated as an abstraction that represents any one or more separate physical buses, point to point connections, or both connected by appropriate bridges, adapters, or controllers. The bus 1316, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1300 operates as part of a user device, although the processing system 1300 may also be connected (e.g., wired or wirelessly) to the user device. In a networked deployment, the processing system 1300 may operate in the capacity of a server or a client machine in a client-server network environment, or as a peer machine in a peer-to-peer (or distributed) network environment.

The processing system 1300 may be a server computer, a client computer, a personal computer (e.g., a laptop or desktop computer), a tablet, a personal digital assistant (PDA), a mobile phone, an iPhone®, an iPad®, a Blackberry®, a processor, a web appliance, a network router, switch or bridge, a console, a hand-held console, a gaming device, a music player, or any machine capable of executing a set of instructions (sequential or otherwise) that specify actions to be taken by the processing system.

While the main memory 1306, non-volatile memory 1310, and storage medium 1326 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1328. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1304, 1308, 1328) set at various times in various memory and storage devices in a computer, and that, when read and executed by one or more processing units or processors 1302, cause the processing system 1300 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1310, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 1312 enables the processing system 1300 to mediate data in a network 1314 with an entity that is external to the processing system 1300 through any known and/or convenient communications protocol supported by the processing system 1300 and the external entity. The network adapter 1312 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1312 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method for facilitating interactive, live streaming sessions in a distributed manner to reduce latency experienced by participants, the method comprising:
   generating a first interface that is accessible to a host;
   receiving, from a first user device associated with the host, first input indicative of user input, from the host, that specifies scheduling details for an interactive session;
   creating a data record that includes the scheduling details for the interactive session;
   generating a second interface that is accessible to multiple participants;
   displaying an invitation to participate in the interactive session on the second interface;
   receiving, from at least two user devices associated with at least two participants, second input indicative of user input, from the at least two participants, that represents an acceptance of the invitation to the interactive session;
   creating the interactive session that is simultaneously accessible to the host via the first interface and the at least two participants via the second interface;
   enabling the host to initiate a first live media stream from the first user device to each of the at least two user devices;
   receiving, from a second user device associated with a particular participant, third input indicative of user input, from the particular participant, that includes a question to be posed to the host;
   displaying the question on the first interface;
   receiving, from the first user device, fourth input indicative of user input, from the host, that represents a selection of the question; and
   enabling the particular participant to initiate a second live media stream from the second user device to the first user device and all other user devices of the at least two user devices,
   wherein said enabling causes the second user device to begin recording audio media, video media, or any combination thereof.

2. The method of claim 1, further comprising:
   receiving, from the first user device, fifth input indicative of user input, from the host, that specifies registration details; and
   creating an account using the registration details specified by the host.

3. The method of claim 2, wherein the registration details include credentials for a social networking service.

4. The method of claim 3, further comprising:
   associating the account with a social networking account of the social networking service.

5. The method of claim 4, further comprising:
   receiving, from the first user device, sixth input indicative of user input, from the host, that represents a request to modify the scheduling details for the interactive session;
   modifying the data record responsive to receiving the sixth input; and
   causing a notification to be transmitted to the at least two participants who have indicated an interest in participating in the interactive session.

6. The method of claim 1, wherein the first and second interfaces are accessible via a web browser, a software program, a mobile application, an over-the-top (OTT) application, or any combination thereof.

7. The method of claim 1, wherein the scheduling details include a date and a time for the interactive session.

8. The method of claim 1, wherein the first and second live media streams include video, audio, photos, text, metadata, or some combination thereof.

9. A system comprising:
   a data storage facility; and
   an interactive platform that is communicatively coupled to the data storage facility and multiple user devices across a network, wherein the interactive platform is configured to:
      generate a first interface that is accessible to a celebrity user who wishes to host an interactive session;
      generate a second interface that is accessible to fan users who are interested in participating in the interactive session;
      receive, at the first interface, scheduling details for the interactive session that are input by the celebrity user;
      post, at the second interface, the scheduling details for review by the fan users;
      receive, at the second interface, confirmation of an intent to attend the interactive session from at least two fan users;
      create the interactive session that is accessible to the celebrity user via the first interface and the at least two fan users via the second interface;
      initiate a first live media stream that is captured by a first user device associated with the celebrity user, wherein the first live media stream is streamed to at least two user devices associated with the at least two fan users;
      receive, at the first interface, a selection of a particular fan user of the at least two fan users; and
      initiate a second live media stream that is captured by a second user device associated with the particular fan user,
         wherein the second live media stream is streamed to the first user device associated with the celebrity user and all other user devices of the at least two user devices associated with the at least two fan users.

10. The system of claim 9, wherein the interactive platform is further configured to:
receive, at the second interface from the particular fan user, a request to pose a question to the celebrity user.

11. The system of claim 10, wherein the interactive platform is further configured to:
calculate a score for the question based on a set of factors;
upon determining the score does not exceed a specified threshold,
refuse the request to pose the question to the celebrity user; and
upon determining the score exceeds the specified threshold,
display the question on the first interface for review by the celebrity user.

12. The system of claim 11, wherein the set of factors includes a count of the particular fan user's followers on a social networking service, whether the particular fan user has been authenticated by the interactive platform, whether the particular fan user has posed other questions in the past, whether the particular fan has participated in other interactive sessions, or some combination thereof.

13. The system of claim 11, wherein the interactive platform is further configured to:
terminate the second live media stream responsive to determining a predetermined time frame has expired or a manual termination instruction has been received from the celebrity user at the first interface.

14. The system of claim 10, wherein the particular fan user submits the request by interacting with an icon presented on the second interface.

15. The system of claim 9, wherein the first user device associated with the celebrity user and the second user device associated with the particular fan user are communicatively coupled to one another via an application programming interface that is executed by an application running on each user device.

16. A physical hardware computer-readable storage medium comprising program instructions that cause a processor to perform a method comprising:
receiving, at a first user device associated with a particular participant, login information for an application running on the first user device;
causing the application to present an interface for engaging in interactive sessions hosted by hosts;
enabling the particular participant to register for an interactive session hosted by a host at a specified date and time;
permitting the particular participant to access the interactive session at the specified date and time;
causing a first live video stream to be presented on the interface for observation by the particular participant, wherein the first live video stream is captured by a second user device associated with the host, and wherein the first live video stream is streamed in near real time to a first set of user devices across a network, the first set of user devices including the first user device and at least one other user device associated with at least one other participant;
allowing the particular participant to submit a request to initiate a second live video stream by interacting with an icon presented on the interface;
initiating the second live video stream,
wherein the second live video stream is captured by the first user device, and
wherein the second live video stream is streamed in near real time to a second set of user devices across the network, the second set of user devices including the second user device and the at least one other user device associated with the at least one other participant; and
terminating the second live video stream responsive to determining a specified period of time has expired, no audio signals have been recognized in the second live video stream for a specified period of time, or a termination instruction has been received at the interface.

17. The computer-readable storage medium of claim 16, wherein the first and second live video streams further comprise metadata.

18. The computer-readable storage medium of claim 16, wherein the login information includes credentials for a service responsible for managing the application or a social networking service.

* * * * *